(12) United States Patent
Barowski et al.

(10) Patent No.: US 7,694,112 B2
(45) Date of Patent: Apr. 6, 2010

(54) MULTIPLEXING OUTPUT FROM SECOND EXECUTION UNIT ADD/SATURATION PROCESSING PORTION OF WIDER WIDTH INTERMEDIATE RESULT OF FIRST PRIMITIVE EXECUTION UNIT FOR COMPOUND COMPUTATION

(75) Inventors: Harry S. Barowski, Boeblingen (DE); J. Adam Butts, Hartsdale, NY (US); Stephen V. Kosonocky, Fort Collins, CO (US); Silvia M. Mueller, Altdorf (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 12/023,432

(22) Filed: Jan. 31, 2008

(65) Prior Publication Data

US 2009/0198974 A1 Aug. 6, 2009

(51) Int. Cl.
*G06F 9/302* (2006.01)
(52) U.S. Cl. ........................................ 712/221; 712/23
(58) Field of Classification Search ....................... None
See application file for complete search history.

(56) References Cited

U.S. PATENT DOCUMENTS

| | | | |
|---|---|---|---|
| 4,899,341 A * | 2/1990 | Tomimitsu | 714/757 |
| 5,410,657 A | 4/1995 | Olson et al. | |
| 5,729,758 A * | 3/1998 | Inoue et al. | 712/22 |
| 6,336,183 B1 | 1/2002 | Le et al. | |
| 6,397,318 B1 * | 5/2002 | Peh | 711/220 |
| 6,460,177 B1 | 10/2002 | Lee | |
| 6,546,480 B1 | 4/2003 | Mandavilli et al. | |
| 6,671,796 B1 | 12/2003 | Sudharsanan et al. | |

FOREIGN PATENT DOCUMENTS

EP 0530372 A1 10/1992

* cited by examiner

*Primary Examiner*—Kenneth S Kim
(74) *Attorney, Agent, or Firm*—Cantor Colburn LLP; Brian Verminski

(57) ABSTRACT

A method for executing multiple computational primitives is provided in accordance with exemplary embodiments. A first computational unit and at least a second computational unit cooperate to execute multiple computational primitives. The first computational unit independently computes other computational primitives. By virtue of arbitration for shared source operand buses or shared result buses, availability of the first and second computational units needed to execute cooperatively the multiple computational primitives is assured by a process of reservation as used for a computational primitive executed on a dedicated computational unit.

2 Claims, 3 Drawing Sheets

MULTIPLEXING OUTPUT FROM SECOND EXECUTION UNIT ADD/SATURATION PROCESSING PORTION OF WIDER WIDTH INTERMEDIATE RESULT OF FIRST PRIMITIVE EXECUTION UNIT FOR COMPOUND COMPUTATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

Exemplary embodiments of the invention relate to the implementation of arithmetic computation units for integrated circuits. Specifically, exemplary embodiments discuss the cooperative use of two different types of computation units to implement a more complex computation.

2. Description of Background

To improve computation performance in the face of decreasing benefit from generational silicon technology improvements, designs have moved to implement more complex computation primitives. In general-purpose microprocessors, such computation primitives often take the form of expanded instruction sets implemented on accelerators coupled tightly to a processor core charged with implementing the standard (legacy) set of instructions. Frequently, to improve computation throughput, such accelerators implement a short-vector SIMD (single-instruction multiple-data) computation model, whereby each instruction specifies an operation to be performed across a wide data word, which, depending on the particular instruction, is interpreted as a vector of a small number (1-16) of sub-words. A single instruction may then specify multiple operations on multiple pieces of data.

The disparate types of operations required in computation accelerators (e.g., arithmetic, logical, and data movement operations) and the wide variety of data types involved (e.g., signed and unsigned integer numbers of different size, floating point numbers of different precisions) have typically required the implementation of many different kinds of functional computation units. For example, one functional unit may handle simple integer operations (such as addition, subtraction, comparison, Boolean logical operations, etc.), another functional unit might be responsible for complex integer operations (multiplications, multiply-adds, additive reductions, etc.), a third functional unit may be for floating-point operations, and still another functional unit may be for data formatting and permutation. This exemplary implementation is very expensive in terms of design effort, circuitry required to implement the different functions separately, and power, especially since external constraints (such as the number of computations that can begin or end at a given time), typically render most of this circuitry idle.

Another approach that leverages the external constraints to reduce the need for special purpose functional units would be beneficial.

SUMMARY OF EXEMPLARY EMBODIMENTS

A method for executing a plurality of computational primitives is provided in accordance with exemplary embodiments. A first computational unit and at least a second computational unit cooperate to execute a plurality of computational primitives. The first computational unit independently computes other computational primitives. By virtue of arbitration for shared source operand buses or shared result buses, availability of the first and second computational units needed to execute cooperatively the plurality of computational primitives is assured by a process of reservation as used for a computational primitive executed on a dedicated computational unit.

Additionally, in accordance with exemplary embodiments, for computation of a plurality of integer multiply operations and a plurality of integer multiply-add operations, one or more independent multiplications can be performed in a multiplier portion of a floating-point multiply-add unit. One portion of an intermediate result may proceed through an adder in the floating-point multiply-add unit and a second portion of the intermediate result can be forwarded to a separate integer adder unit. A final result can be composed by selecting an output of the floating-point multiply-add unit, an output of the separate integer adder unit, or both the output of the floating-point multiply-add unit and the output of the separate integer adder unit.

Additional features and advantages are realized through the techniques of the present invention. Exemplary embodiments of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of exemplary embodiments are apparent from the following detailed description taken in conjunction with the accompanying drawings in which:

The detailed description explains exemplary embodiments, together with advantages and features, by way of example with reference to the drawings.

DETAILED DESCRIPTION OF EXEMPLARY EMBODIMENTS

Exemplary embodiments describe a method of leveraging two (or more) computation units to cooperatively perform certain operations that currently require dedicated computation units. In a state of the art pipeline, a dedicated computation unit must implement all of the circuitry required to perform those operations that are issued to it. In accordance with exemplary embodiments, minor modifications to the functional units can greatly expand the types of instructions that may be performed in a cooperative manner. External constraints, in the form of shared issue ports, input operand buses, and/or result writeback buses, are leveraged to ensure that pipelined computation units are not otherwise occupied when the computation units are required for cooperative execution in exemplary embodiments.

Two exemplary embodiments are described. In the first exemplary embodiment, saturating-integer-sum-across operations are performed by implementing a small, dedicated special-purpose carry-save reduction, followed by the reuse of the full carry-propagate adder and saturation logic already implemented as part of the simple integer computation unit. In the second exemplary embodiment, integer-multiply-add instructions are implemented by using a multiplier within a floating-point computation unit followed by using an adder in the simple integer computation unit. In each case (the first and second exemplary embodiments), the implementation of special-purpose hardware is avoided, and there is no performance penalty from the sharing. Also, only minor modifications to the existing functional units are required.

Figure 1:
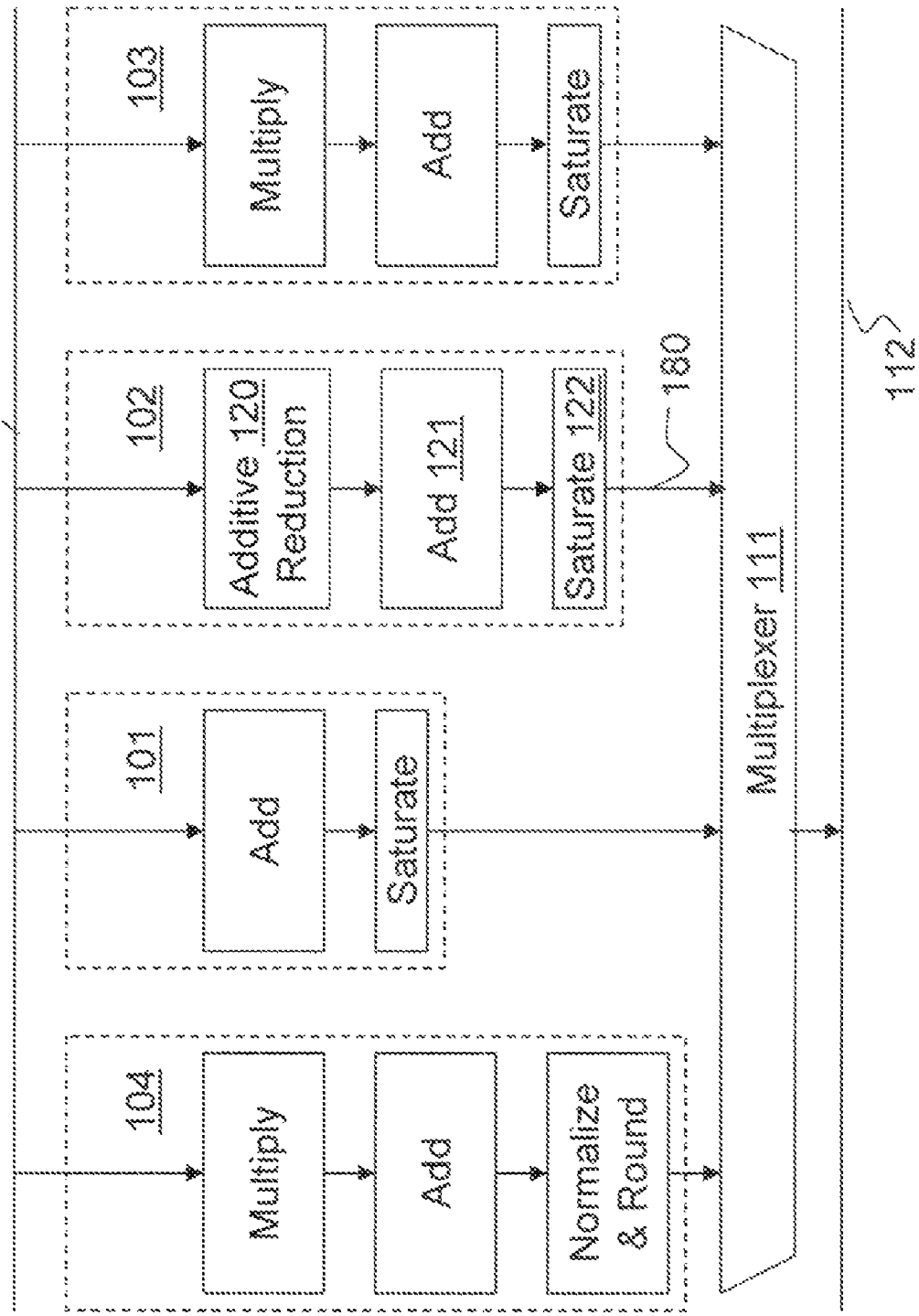
FIG. 1 illustrates a block diagram of a state of the art execution pipeline with separate, pipelined computation units for simple integer, integer sum across, integer multiply-add, and floating-point operations.

FIG. 1 illustrates a block diagram of a state of the art execution pipeline with separate, pipelined computation units for simple integer, integer sum across, integer multiply-add, and floating-point operations.

Figure 2:
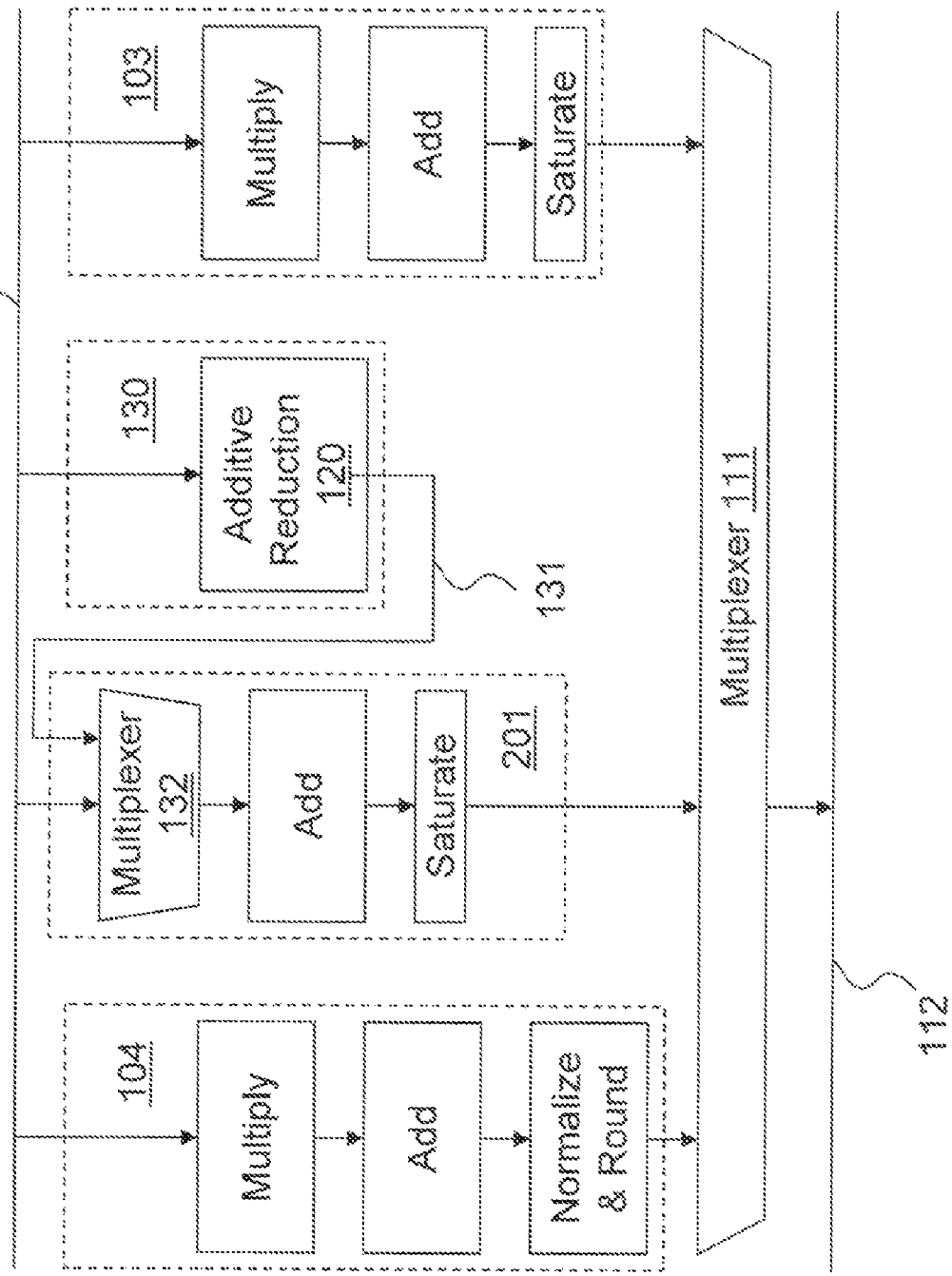
FIG. 2 illustrates a block diagram of a modified execution pipeline of FIG. 1 in accordance with exemplary embodiments.

One exemplary embodiment allows for the transformation of the execution software/hardware represented in FIG. 1 into the simpler software/hardware of FIG. 2. In FIG. 1, a dedicated computation unit (sum-across unit 102) for performing sum-across operations consists of multiple pipeline stages. The sum-across unit 102 shares input operand bus 110 and a result bus 112 with other computation units. The other computation units include a simple integer unit 101, an integer multiply-add unit 103, and a floating-point multiply-add unit 104.

Figure 3:
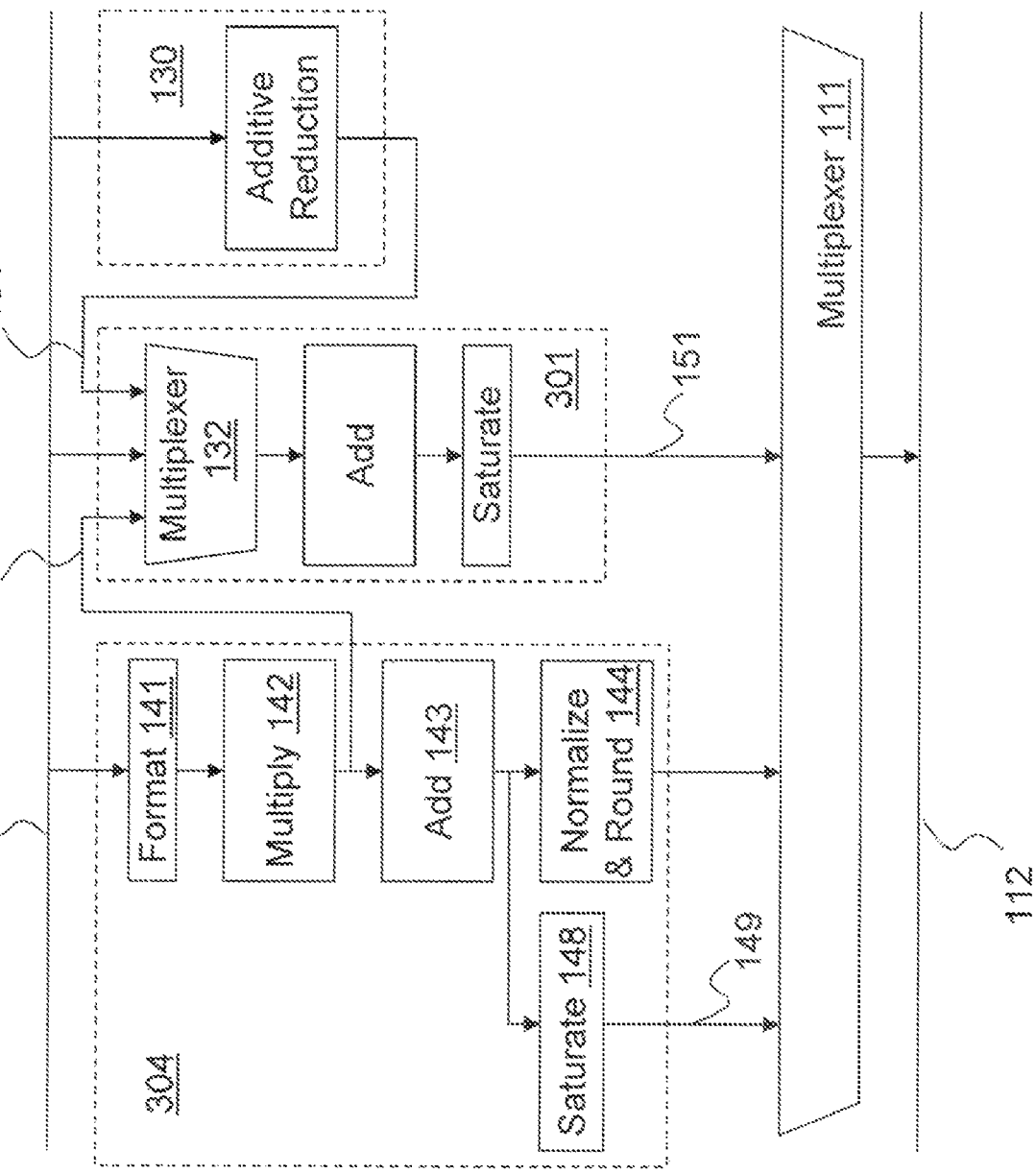
FIG. 3 illustrates a block diagram of the pipeline of FIG. 2 further modified in accordance with exemplary embodiments.

The operation of exemplary embodiments in FIGS. 1 through 3, however, is independent of whether the input operand buses 110 come from an operand store, such as memory or a register file, or an inter-functional-unit result bypass. Arbitration for the shared result bus 112 allows only one functional unit at a time to drive the result bus. In FIGS. 1 through 3, arbitration is performed logically via a multiplexer 111, although alternative implementations could employ, for example, a tri-state bus to achieve the same function.

Referring to FIG. 1, the sum-across operation (of the sum-across unit 102) adds together multiple sub-words of the input operands and returns the result, optionally saturating results that overflow the result operand range. A well-known technique for efficiently performing such multiple operand additions involves the reduction of the operations via carry-save adders 120 into two summands, and the two summands are then added together with some implementation of a carry-propagate adder 121 in order to generate the final sum. Saturation logic 122 causes the final result to be either the minimum or maximum representable number in the event an overflow is detected and saturating arithmetic is desired. The sum-across unit 102 outputs its result to the multiplexer 111 via a connection bus 180.

The simple integer unit 101 also contains a carry-propagate adder and saturation logic in order to implement straightforward, two-operand additions and subtractions.

FIG. 2 illustrates an optimized implementation of the sum-across computation unit 102 of FIG. 1 in accordance with exemplary embodiments. Also, FIG. 2 illustrates a modified execution pipeline wherein the integer sum across unit 102 of FIG. 1 has been replaced by a smaller carry-save reduction unit followed by the use of a simple integer unit to complete the operation in accordance with exemplary embodiments.

As seen in FIG. 2, the complex integer computation unit (i.e., the sum-across unit 102) of FIG. 1 has been replaced by a partial sum-across unit 130 containing only the carry-save adder 120 reduction portion of the original computation unit (i.e., the sum-across unit 102). The carry-save adder 120 tree reduces inputs from the input operand bus 110 into partially-summed inputs, and the partially-summed inputs are forwarded over an inter-functional unit connection bus 131 to the simple integer unit 201. As seen in FIG. 2, an input source selection multiplexer 132 (which is not in the simple integer unit 101 of FIG. 1) has been included in the simple integer unit 201 to select input data from either the original input operand bus 110 or the inter-functional unit connection bus 131 depending on the type of operation. For operations requiring only the simple integer unit 101, source operands arrive on the operand bus 110 and are selected by the multiplexer 132. During a complex integer computation, the multiplexer 132 selects the intermediate data on the bus 132 for completion in the carry-save adder 120. The final result of the sum-across instruction is now generated in the simple integer unit 201, reducing the number of connections to the result selection multiplexer 111. Consequently, the connection bus 180, connecting the sum-across unit 102 to the multiplexer 111 in FIG. 1, is removed in FIG. 2.

In FIG. 2, a feature of the exemplary embodiment is the observation that the simple integer unit 201 cannot be required for a simple integer computation at the same time that a partially completed sum-across instruction (from the carry-save adder 120 of the partial sum-across unit 130) arrives at the input source selection multiplexer 132. This conflict is guaranteed never to occur due to the existing structural hazard represented by the shared result bus 112. If a complex-integer result is expected on the shared result bus 112 in a particular cycle, then no simple-integer operation could have started in a manner that would generate a result in the same cycle, or the shared result bus 112 would be over-committed. Thus, complex-integer operations may be completed within the simple integer unit 201 without conflicting with any simple integer operations using the same unit.

As a non-limiting example, given a latency of S cycles for the simple integer unit 201 and a latency of A (>S) cycles for the original, full sum-across unit 102 (of FIG. 1), the partial sum-across unit 130 is designed with latency A−S. Therefore, given a sum-across computation requested in some cycle N, the result bus 112 is reserved for the result of the sum-across computation in cycle N+A. In the original implementation of FIG. 1, no simple computation may begin in cycle N+A−S, as that would imply a resource conflict at the result bus 112. In the improved implementation in FIG. 2 according to exemplary embodiments, this exact same resource interlock ensures that the simple-integer computation unit 201 is able to receive the partially-completed sum-across instruction (from the partial sum-across, unit 130) at time N+A−S without conflict.

FIG. 3 illustrates a block diagram of the pipeline of FIG. 2 further modified to eliminate the integer multiply-add by using the multiplication hardware in the early portion of the floating point pipeline followed by the use, in parallel, of the carry-propagate full-adders present in the floating-point and simple-integer computation units to complete the operation in accordance with exemplary embodiments. The integer multiply-add unit performs a plurality of operations consisting first of one or more multiplications between different parts (depending on the specific operation) of two input operands (multiplicands) followed by one or more optional additions of parts of a third operand (the addend) to the result of the multiplication(s). The final result(s) may be saturated, depending on the operation.

Referring to the exemplary embodiment of FIG. 3, the integer multiply-add computation unit 104 of FIG. 1 is completely replaced by the cooperative use of a slightly-modified floating point computation unit 304 and a simple integer computation unit 301. The modified floating-point computation unit 304 further consists of an input formatter 141, a multi-format multiplier 142, an adder 143, and floating-point specific logic, such as a normalizer and rounder 144. The normalizer and rounder 144 may be implemented as two separate modules.

The slightly-modified floating point computation unit 304 (similar to a multiply-add unit) performs independent integer multiplications on sub-blocks of the input operands at the multi-format multiplier 142, and the floating point computation unit 304 can then add a third operand to (parts of) the multiplication result at the adder 143. As in the case of the sum-across operations (in the sum-across unit 102 in FIG. 1), saturation may be applied to the result by saturation logic 148.

Further, in the improved implementation of FIG. 3, the multiplication commences in the floating point multiplier 142. An input formatter 141 is included to perform data alignment appropriate to the desired integer multiplication operation. If, e.g., the modified floating point computation unit 304 supports multiple floating point precisions, a formatter (such as the formatter 141) might be needed to convert the different floating point input formats into an internal format. The output of the floating point multiplier 142 is then added to the third operand (addend) to complete the overall multiply-add operation. However, as a non-limiting example, the adder 143 in the modified floating point computation unit 304 might not be wide enough to independently perform all additions required by the now integrated integer multiply-add operations. Therefore, a portion of the output of the floating point multiplier 142 may be forwarded to the simple integer unit 301 via an inter-functional unit connection bus 146. The input source selection multiplexer 132 of the simple integer computation unit 301 is expanded to receive this additional data source from the floating point multiplier 142.

The other half of the floating point multiplier 142 result proceeds within the floating-point pipeline (of the modified floating point computation unit 304) through the (extant) adder 143 in parallel with the addition performed by the simple integer unit 301. Saturation logic 148 is added after the (floating-point) adder 143 to perform integer result saturation, if required, on the partial result in parallel with the same operations occurring in the simple-integer unit 301 on the other partial-result. A new partial-result bus 149 takes the completed integer result from the saturation logic 148 to the result multiplexer 111. The (result) multiplexer 111 is modified to select half of the result from the simple integer unit 301 via the normal result bus 151 and to select the other half from the new partial result bus 149 to form the final result on the shared result bus 112. In this manner, the modified floating-point multiply-add unit 304 and the simple integer unit 301 cooperate, each performing addition and (potentially) saturation on a portion of the final result. The normalizer and rounder 144, required for floating-point operations, are unused when the modified floating-point multiply-add unit 304 is used for cooperatively computing complex integer results.

As discussed herein, the relative latencies of the various pieces of the functional units ensure the availability of the appropriate execution resources without conflict. For example, let latency of the original multiply-add instructions be M, latency of the simple-integer unit 301 be S, latency of the modified floating-point unit 304 be F, latency of the floating-point multiplier 142 be X, and latency of the (floating-point) adder 143 plus saturation logic 148 be A. In this case, we require that S=A such that both portions of the result are computed at the same time. X+S=X+A <=M ensures that there is no performance penalty for applying the exemplary embodiment of the invention versus using dedicated hardware. Since all functional units share input operand buses 110, the floating-point operation is never initiated simultaneously with an integer multiply-add operation. Therefore, the floating-point multiplier 142 and the adder 143 are available for use by such an operation if it arrives. Because of the shared result bus 112, an integer multiply-add operation beginning in a cycle N is guaranteed the result bus 112 at cycle N+X+S. Therefore, no simple integer operation may be initiated at cycle N+X, when the simple integer unit 301 is required to take the output of the floating point multiplier 142. The relative priorities of the different types of operations are not necessarily material to the exemplary embodiments so long as the operand and result buses 110, 112 are managed without collisions.

Currently, modern microprocessors usually have a vector unit like SSE (streaming single instruction, multiple data extensions), SPE (synergistic processor element), or VMX (vector media extensions). The instructions for these vector units can be divided into five groups: load/stores, permute operations, simple fixed point instructions (e.g., additions, logical operation, compares), complex fixed point instructions (e.g., multiplications, sum across instructions), and floating point instructions. State-of-the-art implementations of vector units execute every group of instructions in a separate execution unit.

However, exemplary embodiments execute complex fixed point instructions by a combination of the floating point execution unit and the simple fixed point. The multiplier reduction tree of the floating point unit is reused for fixed point multiplications and most of the sum-across operations. The carry-save outputs of the multiplier are added up by the adders in the floating point unit and the fixed point execution unit. For a reduced set of complex fixed point instructions, the needed reduction may be performed on dedicated hardware. The addition needed for this instruction is performed in the simple fixed point unit. Exemplary embodiments significantly reduce the area and the passive power needed for a vector unit. At the same time, the modification is transparent to the outside, i.e., the modification does not introduce new dependencies and does not modify the latencies of the units.

The capabilities of the present invention can be implemented in software, firmware, hardware or some combination thereof.

As one example, one or more features of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for executing computational primitives on computational units, comprising:

executing by a first computational unit and a second computational unit computational primitives, the computational primitive being an instruction set, wherein each instruction specifies an operation to be performed;

computing part of the computational primitive independently by the first computational unit to result in a part output;

subsequent to computing the part of the computational primitive independently by the first computation unit to result in the part output, computing in parallel:

a first portion of the part output by the first computational unit to result in a first portion output, the first portion output being achieved by an addend operation and a saturation operation of the first computational unit, and a second portion of the output by the second computational unit to result in a second portion output, the second portion output being achieved by an addend operation and a saturation operation of the second computational unit;

selecting by a multiplexer half of the first portion output and half of the second portion output to form a final result on a shared bus of the first computational unit and the second computational unit;

computing for a duration T1 the first portion output part output by the first computational unit to result in the first portion output; and computing for a duration T2 the second portion of the output by the second computational unit to result in the second portion output;

wherein the duration T1 is equal to the duration T2.

2. The method of claim 1, wherein computing in parallel comprises the first portion of the part output computed by the first computational unit to be computed at a same occurrence as the second portion of the part output is computed by the second computational units.

* * * * *